United States Patent
Kedlaya et al.

(10) Patent No.: US 11,734,086 B2
(45) Date of Patent: Aug. 22, 2023

(54) OPERATION-BASED EVENT SUPPRESSION

(71) Applicant: Hewlett Packard Enterprise Development LP, Houston, TX (US)

(72) Inventors: Naveena Kedlaya, Karnataka (IN); Sharath Karkada Srinivasa, Karnataka (IN); Bindu Loganathan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 873 days.

(21) Appl. No.: 16/370,839

(22) Filed: Mar. 29, 2019

(65) Prior Publication Data

US 2020/0310890 A1   Oct. 1, 2020

(51) Int. Cl.
*G06F 9/54* (2006.01)
*G06F 11/00* (2006.01)

(52) U.S. Cl.
CPC ........... *G06F 9/542* (2013.01); *G06F 11/006* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 8,166,352 B2 | 4/2012 | Harnois | |
| 9,246,865 B2 | 1/2016 | Atkins et al. | |
| 9,465,678 B2 | 10/2016 | Gupta et al. | |
| 10,185,642 B1 | 1/2019 | Havemose | |
| 2007/0300302 A1* | 12/2007 | Morin | G08B 29/22 726/23 |
| 2011/0196964 A1 | 8/2011 | Natarajan et al. | |
| 2014/0104195 A1* | 4/2014 | Davidson | G06F 3/038 345/173 |
| 2014/0236983 A1* | 8/2014 | Alves | G06F 16/24532 707/769 |
| 2016/0019776 A1* | 1/2016 | Advani | G06F 16/24568 340/526 |
| 2018/0101423 A1* | 4/2018 | Yoon | G06F 11/3072 |
| 2018/0173216 A1* | 6/2018 | Spiro | G06F 11/3003 |

OTHER PUBLICATIONS

Cisco; "Cisco Firesight Management Center: Context-aware and Adaptive Security"; Nov. 14, 2014; 6 pages.
Linux Man; "Sec(1)—Linux Man Page"; printed on Jan. 25, 2019 from webpage: https://linux.die.net/man/1/sec; 39 pages.
MicroFocus; "Operations Bridge 2018.02 Premium"; Feb. 2018; 42 pages.
Park, H.; "High Availability and Scalability Schemes for Software-defined Networks (SDN)"; 2015; 152 pages.

* cited by examiner

*Primary Examiner* — Chat C Do
*Assistant Examiner* — William C Wood
(74) *Attorney, Agent, or Firm* — Mauriel Kapouytian Woods LLP

(57) ABSTRACT

Techniques for performing operation-based event suppression are described. In an example, a determination may be performed as to whether an event is to be suppressed if the event is received in response to performance of an operation. The determination may be performed based on at least one of number of actions triggered by the event, frequency of occurrence of the event in an event stream in response to performance of the operation, and frequency of occurrence of the event in the event stream without performance of the first operation.

16 Claims, 8 Drawing Sheets

OPERATION-BASED EVENT SUPPRESSION

BACKGROUND

A computing environment, such as a data center, may generate events, which may be indicative of functioning of components of the computing environment. Sometimes, several events may be generated in a short period of time due to performance of an operation in the computing environment. The operation may be, for example, powering on or restarting a blade server in the computing environment, powering on an enclosure having several blade servers, adding a blade server to the enclosure, replacing power units of several rack-mount servers, and the like.

BRIEF DESCRIPTION OF DRAWINGS

The following detailed description references the figures, wherein.

DETAILED DESCRIPTION

Figure 1:
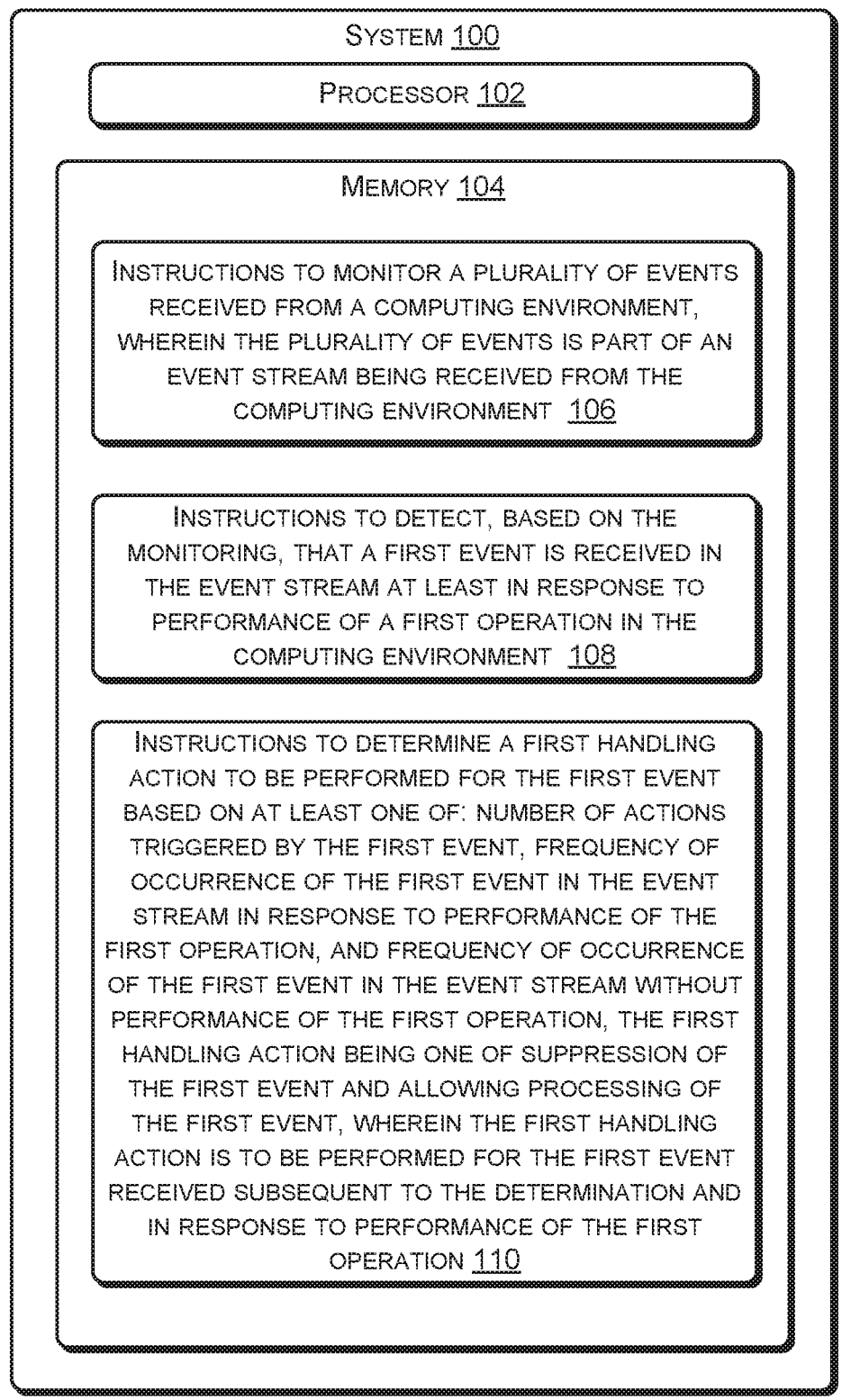
FIG. 1 illustrates a system for performing operation-based event suppression, according to an example implementation of the present subject matter.

An event generated in a computing environment may provide information regarding functioning of a component in the computing environment. For example, an event may indicate that a computing device, such as a blade server, in the computing environment is powered on. As another example, an event may indicate that an enclosure housing several blade servers is powered on. Sometimes, an event may have to be acted upon, i.e., the event may trigger an action. For example, an event indicating that a computing device is powered on may trigger an inventory collection action, which may involve collecting details of various components in the computing device. The events from the computing environment may be received by a management station on which the events may be displayed, and actions to be performed for the events, i.e., actions triggered by the events, may be determined and performed.

Generally, several events may be generated in the computing environment if an operation is performed in the computing environment. Example operation performed in the computing environment may be powering on an enclosure housing several computing devices and example events generated on powering on of the enclosure are a server powered on event from each server in the enclosure, events indicating discovery of various components of each server, and a server post discovery complete event from each server. Further, some of the generated events may trigger actions. For example, in response to the server post discovery complete event, the management station may have to perform the inventory collection action.

In some cases, many events generated due to the performance of the operation are expected events that occur during the performance of the operation. Such events may not indicate an anomaly in the computing environment or any part thereof, and may not be acted upon by the management station. On the other hand, an event arriving in isolation, i.e., without performance of an operation, may have to be acted upon. Further, due to performance of an operation, several identical events may be received. For instance, during performance of a profile apply operation to a computing device, the computing device may be powered on several times, and a power-on event may be received several times. Accordingly, acting upon each such event, such as collecting inventory for each power-on event, may lead to wastage of computational resources of the management station. Still further, since several events may be received due to performance of the operation, acting upon all events may lead to overloading of the management station.

The present subject matter relates to operation-based suppression of events. With the implementations of the present subject matter, overloading of a system that handles events from a computing environment may be prevented.

In accordance with an example implementation, a plurality of events received from a computing environment is monitored. The plurality of events may be part of an event stream being received from the computing environment. Based on the monitoring, it may be detected that a first event is received at least in response to performance of a first operation in the computing environment. In an example, the detection may involve receiving a set of events including the first event at a high event arrival rate. Accordingly, the set of events may be deduced as being received due to performance of the first operation. In some cases, the first event may be received without performance of the first operation as well.

A first handling action to be performed for the first event may be determined. The first handling action may be suppression of the first event or allowing processing of the first event. The first handling action may be determined based on at least one of: (i) number of actions triggered by the first event, (ii) frequency of occurrence of the first event in the event stream in response to performance of the first operation, and (iii) frequency of occurrence of the first event in the event stream without performance of the first operation.

The first handling action may be the handling action to be performed for each first event that is received in response to performance of the first operation and after determination of the first handling action. For instance, if the first handling action is determined as suppression, and, after the determination, if the first event is received in response to performance of the first operation, the first event is suppressed. The first event may be detected as being received in response to performance of the first operation if, for example, the first event is received as part of the first set of events.

In an example, the first handling action may be determined for each event of the first set of events. Accordingly, upon receiving the first set of events, which may indicate that the first operation is performed, each event of the first set of events is subjected to its corresponding first handling action.

The present subject matter determines a handling action for an event based on a context the event is received in. For instance, the present subject matter determines if an event is to be suppressed based on whether the event is received due to performance of an operation. Therefore, the present subject matter can be utilized for reducing the number of events to be acted upon when the operation is performed. The determination of the handling action based on number of actions triggered ensures that the system that is to process the events is not overloaded because of performing several actions. Further, determination of handling action based on frequency of arrival of events in the event stream due to and without performance of the operation ensures that expected events and events not indicating an anomaly in the computing environment are not acted upon when the operation is performed.

Example implementations of the present subject matter are described with regard to computing environments having a plurality of devices, such as plurality of computing devices and enclosures. However, it will be understood that the implementations of the present subject matter can be used for a computing environment having a single device, such as a single computing device, that can generate events.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for performing operation-based event suppression, according to an example implementation of the present subject matter. The system 100 may be implemented as any of a variety of computing systems, such as a desktop computer, a laptop computer, a server, and the like. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the memory 104. The computer-readable instructions, hereinafter referred to as instructions, includes instructions 106, instructions 108, and instructions 110. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the system 100 may monitor a plurality of events received from a computing environment. The plurality of events is part of an event stream being received from the computing environment. The monitoring may be performed by the processor 102 on execution of the instructions 106. Based on the monitoring, the system 100 may detect that a first event is received in the event stream at least in response to performance of a first operation in the computing environment. The detection may be performed by the processor by executing the instructions 108.

The system 100 may determine a first handling action to be performed for the first event. The first handling action may be one of suppression of the first event and allowing processing of the first event. The determination may be performed by the processor 102 by executing the instructions 110. The first handling action may be the handling action to be performed for a first event that is received in response to performance of the first operation and subsequent to determination of the first handling action. For instance, after the determination that the first handling action is suppression, if the first event is received in response to performance of the first operation, the first event is suppressed. Hereinafter, the terms "in response to performance of the first operation" and "due to performance of the first operation" will be used interchangeably.

The first handling action may be determined based on at least one of: (i) number of actions triggered by the first event, (ii) frequency of occurrence of the first event in the event stream due to performance of the first operation, and (iii) frequency of occurrence of the first event in the event stream without performance of the first operation.

Figure 2:
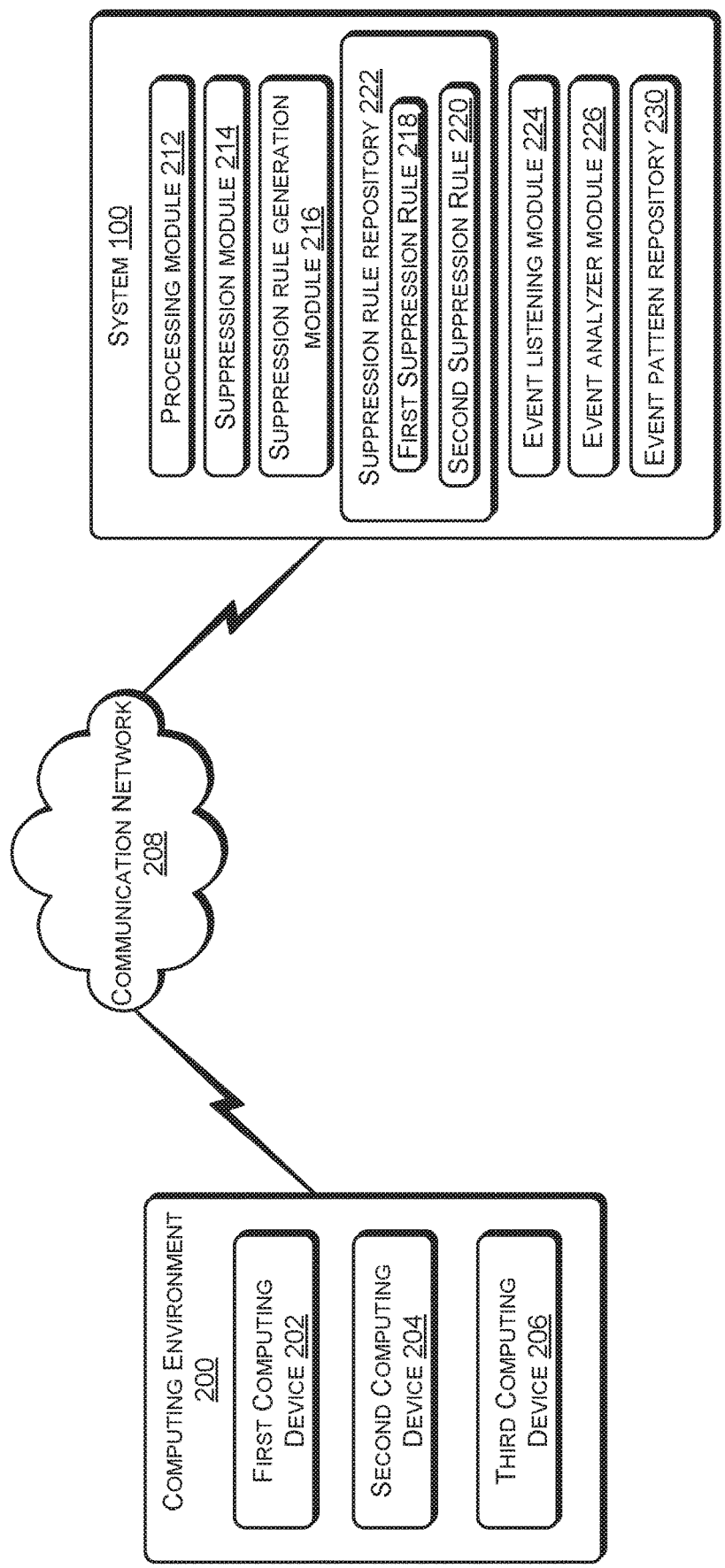
FIG. 2 illustrates a system and a computing environment from which an event stream is received by the system, according to an example implementation of the present subject matter.

FIG. 2 illustrates the system 100 connected to a computing environment 200 from which an event stream is received by the system 100, according to an example implementation of the present subject matter. The computing environment 200 may include a plurality of computing devices (e.g., servers), such as a first computing device 202, a second computing device 204, a third computing device 206. The computing devices may be, for example, blade servers. In addition to the computing devices, the computing environment 200 includes other components, such as enclosures that can house computing devices, switches, routers, and the like (not shown in FIG. 2). In an example, the computing environment 200 may be a data center, such as a software-defined data center.

The system 100 may be a management station from which the devices of the computing environment 200 can be remotely managed. For example, the system 100 can be used to monitor events generated in the computing environment 200 and to take actions on the events. The actions may be taken by the management station itself or by a user of the management station. In an example, the system 100 may be used to manage a subset of all the devices in the computing environment 200. For instance, while the computing environment 200 may have hundreds of computing devices, the system 100 may be used to manage ten computing devices. The devices that can be managed using the system 100 may be owned or used by a particular organization. The organization may use the system 100 for managing the subset of devices.

To remotely manage the computing environment 200, the system 100 may be connected to the computing environment 200 through a communication network 208. The communication network 208 may be a wireless or a wired network, or a combination thereof. The communication network 208 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

An event generated in the computing environment 200 may relate to an operational status of one or more devices in the computing environment 200. Example events are an event indicating that the first computing device 202 is powered on and an event indicating that a firmware installed on the first computing device 202 is updated. In some cases, several events may be received from the computing environment 200 in a relatively short period of time if an operation is performed in the computing environment 200. The operation may be performed on a component, such as an enclosure or a computing device, in the computing environment 200. An operation performed on a computing device may be, for example, powering on the computing device, restarting the computing device, upgrading firmware of a component in the computing device, applying a profile to the computing device, and the like. Example operations performed on an enclosure may be addition of a computing device in the enclosure and powering on the enclosure, so that all computing devices housed in the enclosure are powered on. Further, events received due to performance of the operation may trigger some actions. In some cases, events generated due to performance of an operation may not be acted upon, as will be explained below:

Consider, for example, a profile apply operation on the first computing device 202. The profile apply operation may be performed on the first computing device 202 when the first computing device 202 is imported to the computing environment 200. The profile apply operation may involve, for example, configuring login credentials, configuring Network Time Protocol (NTP) client, configuring Simple Network Management Protocol (SNMP) agent, configuring administrator email address, updating firmware, and configuring BIOS (basic input/output system) settings. The performance of the profile apply operation may involve several cycles of powering off and powering on of the first computing device 202. Accordingly, several power-on events may be received when the profile apply operation is carried out. Each power-on event may trigger an action, such as an inventory collection action. An inventory collection action involves collecting details of the hardware, software, and firmware installed on the server. While the inventory collection action may have to be performed for a power-on event received without the profile apply operation, it may not have to be performed during the profile apply operation. This may be because the profile apply operation involves several power-on events, and performing the inventory collection action for each power-on event may be a wasteful exercise. For instance, one inventory collection action may be triggered for several power-on events.

Accordingly, in some cases, some events received due to performance of an operation are to be suppressed, i.e., are not to be acted upon. The system 100 may select the events that are to be suppressed in response to performance of the operation. The suppression of an event may involve preventing the event from being sent to an entity that can act upon or that can be used to act upon events. The entity may be a processing module 212. The processing module 212 may be present in the management station. Accordingly, if the system 100 is the management station, the processing module 212 may be present in the system 100, as illustrated in FIG. 2. The suppression of the events and forwarding the non-suppressed events to the processing module 212 may be performed by a suppression module 214, which is present in the system 100.

In an example, the system 100 may generate a plurality of suppression rules, each corresponding to an operation. The suppression rules may be generated, for example, by a suppression rule generation module 216. The suppression rule corresponding to an operation may specify an event to be suppressed if the event is received due to performance of the operation. Accordingly, upon receiving an event in response to performance of an operation, the system 100 may compare the event against the suppression rule corresponding to the operation and determine whether the event is to be suppressed. The plurality of suppression rules may include a first suppression rule 218 corresponding to a first operation and a second suppression rule 220 corresponding to a second operation. The suppression rules corresponding to the different operations may be stored by the suppression rule generation module 16 in a suppression rule repository 222.

In operation, an event listening module 224 may receive events generated in the computing environment 200. The event listening module 224 may include, for example, a SNMP trap receiver for receiving SNMP traps, which may be alert messages sent by a SNMP-enabled device. The event listening module 224 may also include a Redfish event listener, which can read and record events from Redfish services. Redfish standard may be referred to as a collection of specifications that deliver a protocol for management for converged infrastructure. Redfish standard can be used to retrieve data regarding hardware. The event listening module 224 may supply the received events to an event analyzer module 226.

The event analyzer module 226 may monitor a plurality of events being received from the computing environment 200. Based on the monitoring, the event analyzer module 226 may learn event patterns associated with different operations and store the learnt event patterns in an event pattern repository 230. For the learning, the event analyzer module 226 may utilize a machine learning technique. After the learning, if an event pattern is received that is similar to an event pattern stored in the event pattern repository 230 and that corresponds to an operation, the event analyzer module 226 may inform the suppression module 214, which may then may utilize a suppression rule corresponding to the operation to suppress events. In an example, the event analyzer module 226 may also determine a component to which an operation relates based on the event pattern. Further, the event analyzer module 226 may set a flag for a resource node corresponding to the component. The resource node may be a logical representation of the component. Upon completion of the event pattern, indicating that events corresponding to the operation have stopped arriving, the event analyzer module 226 may unset the flag set for the resource node.

Figure 3:
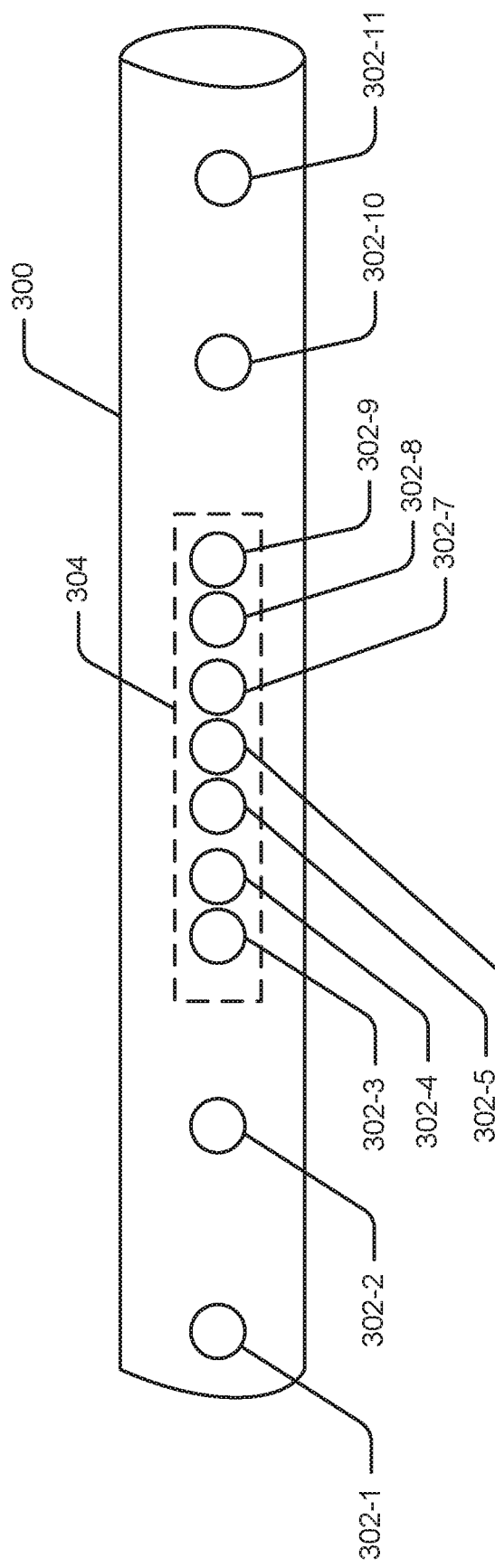
FIG. 3 illustrates an event stream being received by a system from a computing environment, according to an example implementation of the present subject matter.

FIG. 3 illustrates an event stream 300 being received by the system 100 from the computing environment 200, according to an example implementation of the present subject matter. The event stream 300 may refer to a continuous stream of incoming events from the computing environment 200. The events may be received from devices that are managed by and/or managed using the system 100.

The events of the event stream 300 may be received by the system 100 at various points of time. For example, an event 302-1 may be received at a first point of time, an event 302-2 may be received at a second point of time after the first point of time, an event 302-3 may be received at a third point of time after the second point of time, and so on. The receipt of events by the system 100 may also be referred to as arrival of events at the system 100. A time gap between arrival of two successive events indicates a rate of arrival of events. For instance, if a time gap between the first point of time, at which the event 302-1 arrived, and the second point of time, at which the event 302-2 arrived, is one second, the rate of arrival of events may be 1 event per second. The rate of arrival of events may also be referred to as an event arrival rate.

In some cases, the event arrival rate may increase due to performance of an operation in the computing environment 200. For instance, as illustrated, events 302-3 to 302-9 may be received in a relatively short period of time. Such an increase in the event arrival rate may be due to performance of a first operation in the computing environment 200.

To detect performance of an operation in the computing environment 200 and to determine events that are to be received due to the performance of the operation, the system 100 may monitor a plurality of events of the event stream 300, as will be explained below with reference to the first operation:

Initially, the system 100 may allow all events arriving from the computing environment 200 to pass through to the processing module 212 for processing. While allowing the events, the system 100 may monitor and record characteristics of the arriving events. The characteristics of the events may include event attributes, such as a device (e.g., the first computing device 202) from which the event originated (also referred to as "event origin"), a component of the device (e.g., a network interface card (NIC) of the first computing device 202) with which the event is concerned, and a type of the event, such as a lifecycle event or an information event. A lifecycle event may be an event that indicates a state in the lifecycle of a device. An information event may be an event that merely provides information, and does not have to be acted upon. The characteristics of the events may also include an order in which the events are received. For example, the system 100 may monitor that the event 302-1 is followed by the event 302-2, and that the event 302-2 is followed by the event 302-3. The characteristics may further include temporal distribution of the events. For example, the system 100 may monitor the time gap between the event 302-1 and the event 302-2 and the time gap between the event 302-2 and the event 302-3.

Based on the temporal distribution of the events, the system 100 may monitor the event arrival rates. If the system 100 identifies a sudden increase in the event arrival rate, the system 100 may infer that the sudden increase is due to performance of an operation in the computing environment 200. For instance, if an average event arrival rate in the past one hour was 2 events per second, and if, in the one past minute, events are arriving at a rate of 10 events per second, the system 100 may deduce that an operation, such as a first operation, is performed in the computing environment 200. In an example, to deduce that an operation is performed, the system 100 may utilize an average event arrival rate over a period of time and an event arrival threshold. If a difference between the current event arrival rate and the average event arrival rate is greater than the event arrival threshold, the system 100 may infer that an operation is performed. For instance, if the average event arrival rate is 5 events per second and the event arrival threshold is 3 events, the system 100 may deduce that an operation is performed if the average event arrival rate is 9 events per second or more. The event arrival rate that is greater than the average event arrival rate by more than the event arrival threshold may be referred to as a first event arrival rate or a first event arrival rate. Accordingly, the first event arrival rate may be any event arrival rate that is greater than a sum of the average event arrival rate and the event arrival threshold. In an example, the period of time over which the average event arrival rate is computed may be a large period of time, so that the impact of transient peaks and troughs in the event arrival rate is neutralized. Such a period of time may be referred to as a first time period. Further, the event arrival threshold may be decided based on an analysis of the event stream 300 for a large period of time, such that the event arrival threshold can be used to distinguish between an increase in the event arrival rate due to performance of the operation and an increase in the event arrival rate otherwise. The first time period, the event arrival threshold, and the average event arrival rate may be determined by the event analyzer module 226 using a machine learning technique.

In an example, the system 100 may deduce that an operation is performed if the increase in the event arrival rate persists for a relatively long period of time. In another example, the system 100 may count the number of events arrived for a relatively long period of time for computing the event arrival rate. For instance, the system 100 may compute the event arrival rate in terms of number of events arriving per minute or per half-a-minute, instead of per second. The persistence of the increased event arrival rate for a long period of time or the presence of an increased event arrival rate computed in terms of a longer period of time ensures that the increase in event arrival rate is not transient, and is due to performance of an operation.

Upon deducing that an operation is being performed, the system 100 may record the events being received at the first event arrival rate and their characteristics, for example, in the event pattern repository 230. For example, if it is determined that the events 302-3 to 302-9 are received at the first event arrival rate, the system 100 may record characteristics of the events 302-3 to 302-9. The events 302-3 to 302-9, which are received at the first event arrival rate, may be designated as being part of a first cluster of events 304 or a first event cluster 304. The first event cluster 304 and its characteristics may be referred to as a first pattern of events or a first event pattern. Further, the system 100 may deduce that the first event cluster 304 is received due to the performance of the first operation and may map the first event pattern to the first operation.

It may be noted that the system 100 is not to be aware of the actual operation performed in the computing environment 200. For example, the system 100 is not to be aware that the first event cluster 304 is being received because of application of profile to the first computing device 202. Rather, the system 100 is to maintain a mapping between the first event pattern with, say, a distinct operation identifier. The event 302-3, which is part of the first event cluster 304, may be referred to as a first event 302-3. In an example, the first event 302-3 may be the first event that arrives due to performance of the first operation. For instance, in case of power-on of the first computing device 202, the first event 302-3 may be the server powered-on event.

In the above manner, the system 100 detects that the first event 302-3 is received at least due to performance of the first operation in the computing environment 200. In an example, the first event cluster 304 may be learned over a plurality of first operations in the computing environment 200. For instance, the system 100 may first identify a first version of the first event cluster 304 in the manner as explained above. In the same manner, the system 100 may identify a second version of the first event cluster 304, due to performance of the first operation for a second time. The system 100 may then compare the first version and the second version to identify the common events among versions. Subsequently, the system 100 may determine the common events to be the first event cluster 304. The learning of the first event cluster 304 over a plurality of first operations may prevent false identification of an event as being received due to the first operation. For example, consider that, while events are arriving due to the performance of the first operation, another event not arising due to the first operation also arrives. In such a case, the other event may also be falsely designated as being part of the first event cluster 304. Since the common events across two versions of the first event cluster 304 is determined as the first event cluster 304, the other event may not form part of the final version of the first event cluster 304, as the second version may not have that event. Therefore, the present subject matter enables accurately identifying the cluster of events that would arrive on performance of an operation.

In an example, the system 100 may update the first event pattern. The system 100 may deduce that the first event pattern is to be updated based on similarity of an incoming event with the first event pattern. For instance, if an event pattern similar to the first event pattern is received, and the event pattern differs from the first event pattern in terms of one or more event attributes, such as firmware version, the system 100 may infer that the first event pattern has got updated, such as due to change in the firmware version. Accordingly, the system 100 may update the first event pattern in the event pattern repository 230.

Upon identification of the first event pattern, the system 100 may identify future performances of the first operation in the computing environment 200 using the first event pattern, as will be explained with reference to FIG. 4.

Figure 4:
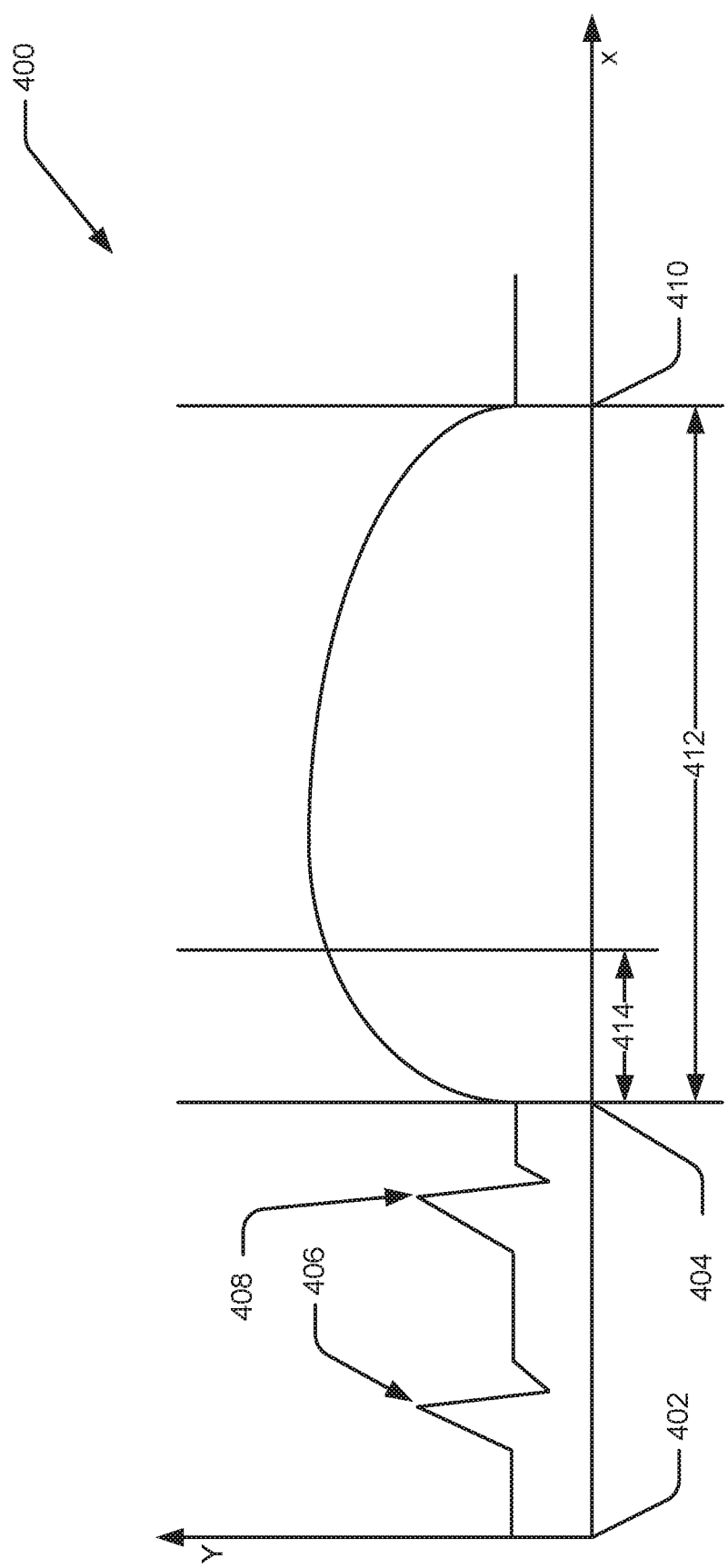
FIG. 4 illustrates an alternative manner of depicting event arrival rate, according to an example implementation of the present subject matter.

FIG. 4 illustrates an alternative manner of depicting the event arrival rate, according to an example implementation of the present subject matter. Here, the x-axis of a graph 400 represents time and y-axis of the graph 400 represents number of events arriving from the computing environment 200. Accordingly, the graph 400 indicates the event arrival rate. As illustrated, the event arrival rate may remain substantially constant between a first point of time 402 and a second point of time 404 barring a few transient changes, such as a first spike 406 and a second spike 408. From the second point of time 404, the event arrival rate may increase. The event arrival rate may be the first event arrival rate, i.e., greater than the sum of the average event arrival rate over the first period of time and the event arrival threshold. Accordingly, the system 100 may deduce that the events arriving at the first event arrival rate are part of a cluster of events, such as the first event cluster 304, and are arriving due to the performance of an operation in the computing environment 200, such as the first operation.

The system 100 may determine a time duration for which the events of the first event cluster 304 are received. In an example, the system 100 may identify the time duration based on the event arrival rate. For instance, the system 100 may identify a point of time at which the events started arriving at the first event arrival rate. This point of time may be the second point of time 404. The system 100 may also identify a point of time until which the events are arriving at the first event arrival rate. This point of time may be a third point of time 410. The system 100 may then identify the difference between the third point of time 410 and the second point of time 404 as a time duration 412, for which events of the first event cluster 304 are received. Alternatively, or in addition to the aforesaid determination of the time duration 412, the system 100 may identify the time duration 412 based on comparisons of various versions of the first event cluster 304. For instance, as explained earlier, the system 100 may record various versions of the first event cluster 304. Thereafter, the system 100 may compare the various versions, and identify the common events across the versions as a final version of the first event cluster 304. Subsequently, the time gap between the first event of the first event cluster 304 and the last event of the first event cluster 304 may be identified as the time duration 412. The computation of the time duration 412 in this manner enables accurate measurement of the time duration 412 even if, beyond a certain point of time, the event arrival rate due to the first operation drops below the first event arrival rate.

The system 100 may determine which events of the first event cluster 304. The system 100 may perform the determination based on one or more factors. The determination will be explained below with respect to the first event 302-3.

A first factor may be a number of actions triggered by the first event 302-3. As mentioned earlier, the first event 302-3 may trigger one or more actions. The actions triggered by the first event 302-3 include actions to be performed by the management station and/or actions to be performed by a computing device from which the event originated. In some cases, the actions may be initiated by a user of the management station, while in some other cases, the management station may automatically initiate the actions based on a predefined mapping of the first event 302-3 with the actions. An example first event 302-3 may indicate that the first computing device 202 is powered on. Such an event may trigger a plurality of inventory collection actions. Each inventory collection action may involve the first computing device 202 collecting inventory for a component, such as a processor, a firmware, or a dual in-line memory module (DIMM), of the first computing device 202. In an example, the number of actions triggered by the first event 302-3 may include not just the actions triggered by the first event 302-3, but also the actions triggered due to each of the aforesaid actions. For example, the inventory collection action may trigger an action of clearing alerts received as a result of the inventory collection.

The number of actions triggered by the first event 302-3 may be used to determine whether the event is to be suppressed because the number of actions triggered provides an indication of the amount of resources to be expended by the management station to process the first event 302-3. For instance, if the number of actions triggered is large, such as greater than a first action threshold, the system 100 may determine that the first event 302-3 may cause consumption of a significant amount of computational resources. Accordingly, when the first event 302-3 is received due to performance of the first operation, which results in the arrival of a large number of events in a small period of time, the processing of the first event 302-3, along with other events received, may cause overloading of the management station. Thus, if the number of actions triggered by the first event 302-3 is greater than the first action threshold, the system 100 may determine that the first event 302-3 is to be suppressed if it is received due to performance of the first operation.

To determine the number of actions triggered by the first event 302-3, the system 100 may maintain an action mapping table (not shown in FIG. 4) that has a mapping of the number of actions triggered by each of a plurality of events. In an example, the action mapping table may be provided by a user, such as a user of the management station, based on prior knowledge of actions triggered by events. In another example, the system 100 may automatically generate the action mapping table. To generate the action mapping table, the system 100 may identify a causal relationship between an event and another event subsequently received that indicates performance of an action. For instance, if an event A is always followed by an event B and the event B indicates performance of an action, the system 100 may determine that the event A triggered the action indicated by the event B. The system 100 may generate the action mapping table using other techniques that enable tracking actions performed in response to an event.

In an example, the first event 302-3 may be suppressed if the number of actions triggered by the first event 302-3 is lesser than a second action threshold. The second action threshold may be lesser than the first action threshold. When the number of actions triggered by the first event 302-3 is lesser than the second action threshold, the system 100 may infer that the first event 302-3 is not of value to the computing environment 200. Accordingly, the system 100 may decide that the first event 302-3 is to be suppressed if the first event 302-3 is received due to performance of the first operation. In an example, the second action threshold may be one. For instance, the system 100 may determine that the first event 302-3 is to be suppressed if it is not acted upon. The number of actions triggered may be lesser than the second action threshold, for example, if the first event 302-3 is an information event.

A second factor that may be used for determining whether the first event 302-3 is to be suppressed is frequency of occurrence of the first event 302-3 in the event stream 300 if the first operation is performed. The frequency of occurrence of the first event 302-3 in the event stream 300 due to performance of the first operation may refer to a number of times the first event 302-3 occurs in the first event cluster 304. If the first event 302-3 is received several times in the first event cluster 304, performing actions triggered by the first event 302-3 for each time the first event 302-3 occurs may be a wasteful exercise. Accordingly, if the frequency of occurrence of the first event 302-3 in the first event cluster 304 is greater than, say, a first frequency threshold, the system 100 may determine that the first event 302-3 is to be suppressed if it is received due to the performance of the first operation. In an example, if a plurality of first events 302-3 is received as part of the first event cluster 304, i.e., due to the performance of the first operation, the system 100 may determine that a first subset of the plurality of first events 302-3 are to be suppressed, while a second subset of the plurality of first events 302-3 are to be allowed for processing. Therefore, the present subject matter ensures that the computational resources are not wasted on performing the same set of actions repeatedly, while also ensuring that actions corresponding to the event are performed. In an example, the second subset may include one first event 302-3.

A third factor that may be used for determining whether the first event 302-3 is to be suppressed is frequency of occurrence of the first event 302-3 in the event stream 300 without performance of the first operation. The frequency of occurrence of the first event 302-3 without performance of the first operation may be referred to as a second frequency of the first event 302-3. The second frequency of the first event 302-3 may be the number of times the first event 302-3 arrives outside of the first event cluster 304. The second frequency may be the number of times the first event 302-3 occurs arrived outside of the first event cluster 304 over a predetermined period of time.

If the first event 302-3 rarely occurs or never occurs outside of the first event cluster 304, the system 100 may infer that the first event 302-3 is exclusive to the first operation. For example, an event indicating successful update of firmware of a baseboard management controller (BMC) in the first computing device 202 may arrive if a firmware of the BMC is updated, and may not arrive otherwise. Accordingly, if the second frequency is lesser than a second frequency threshold, the system 100 may determine that the first event 302-3 is not to be suppressed if it is received due to the performance of the first operation. As a counter-example, consider that, for the update of firmware of the BMC, another event also arrives. Consider also that the other event arises several times in the event stream 300 even without update of the firmware of the BMC. Therefore, it is likely that the other event is processed while it was received without update of the firmware, and therefore, it does not have to be acted upon when it arrives due to update of the firmware BMC.

In an example, any combination of the above factors may be used to determine whether the first event 302-3 is to be suppressed or not. Further, in an example, to determine whether the first event 302-3 is to be suppressed due to the first operation, a weight may be assigned to the first event 302-3. The weight may be function of one or more of the three factors. If the weight is greater than a weight threshold for an event, the system 100 may determine that the event is to be suppressed if the operation is performed. The thresholds associated with the various factors and the weight threshold may be determined by the event analyzer module 226 by monitoring the event patterns.

The consideration of the above factors for determining events to be suppressed ensures that a well-informed decision is taken regarding the events to be suppressed. Therefore, the present subject matter ensures that the management station does not get overloaded because of events arriving due to performance of an operation, while also ensuring that events that are to be processed are still processed.

In the above explanation, one of two possible handling actions are determined for the first event 302-3 if the first event 302-3 is received due to the performance of the first operation. The two handling actions are: (i) suppressing the first event 302-3 and (ii) allowing the first event 302-3 to be processed by the processing module 212. The handling action to be performed if the first event 302-3 is received due to the performance of the first operation is referred to as a first handling action. The first handling action may be performed for the first event 302-3 for the first event 302-3 received after the determination of the first handling action. For instance, if a first event 302-3 is received in the event stream 300 after determination of the first handling action, and if such first event 302-3 is detected to be received due to performance of the first operation, such first event 302-3 is subjected to the first handling action.

In addition to the first handling action, the system 100 may also determine a second handling action for the first event 302-3. The second handling action is to be performed if the first event 302-3 is received without the performance of the first operation. Similar to the first handling action, the second handling action may also be one of suppressing the first event 302-3 and allowing the first event 302-3 to be processed. The second handling action may be determined based on the third factor, i.e., frequency of occurrence of the first event 302-3 in the event stream 300 without performance of the first operation. The second handling action may be determined to be suppression of the first event 302-3 if the second frequency (the frequency of occurrence of the first event 302-3 in the event stream 300 without performance of the first operation) is lesser than the second frequency threshold. For instance, as explained earlier, if the second frequency is lesser than the second frequency threshold, the system 100 may infer that the first event 302-3 is exclusive to the first operation. Accordingly, if the first event 302-3 arrives without performance of the first operation, the system 100 may deduce that the first event 302-3 has been generated erroneously, and that the first event 302-3 is a false alarm, and suppress the first event 302-3. Therefore, the present subject matter facilitates determining a handling action for events based on whether the event is received due to performance of an operation or without performance of the operation.

The second handling action may be performed for the first event 302-3 received after the determination of the second handling action. Accordingly, for each first event 302-3 that is received after determination of the second handling action and without performance of the first operation, the second handling action may be performed.

Although, in the above the above explanation, the determination of the first handling action and the second handling action are described for the first event 302-3, the system 100 may determine the first handling action and the second handling action for a plurality of events. In an example, the system 100 may determine the first handling action and the second handling action for each event that is part of the first event cluster 304. The first handling action for each event may be performed based on the three factors corresponding to the event, i.e., number of actions triggered by the event, frequency of occurrence of the event in the event stream in response to performance of the first operation, and frequency of occurrence of the event in the event stream without performance of the first operation.

After the first handling action is determined for an event, subsequently, when the event is received due to performance of the first operation, the event may be subjected to the first handling action. The detection that an event is received due to performance of the first operation, and the subsequent performance of the first handling action is explained below with respect to the first event 302-3:

To detect whether the first event 302-3 is received due to performance of the first operation, the system 100 may utilize the first event pattern. The system 100 may compare a pattern of incoming events from the computing environment 200 with the first event pattern. For instance, the system 100 may compare an order of arrival of events with an order of events in the first event pattern. The system 100 may also compare the temporal distribution of the incoming events with the temporal distribution of events in the first event pattern. Based on the above comparisons, if an incoming event pattern is similar to the first event pattern, the system 100 may detect that the first operation is performed in the computing environment 200.

In an example, the system 100 may compare the incoming pattern of events with a subset of the first event pattern to detect that the incoming pattern of events correspond to the first operation. The subset of the first event pattern may correspond to a subset of the first event cluster 304. The subset of the first event cluster 304 may be referred to as a first set of events. The first set of events may be the events of the first event cluster 304 that are received in a second time duration 414 that is a subset of the time duration 412. In an example, events of the first set of events may be the first few events received due to performance of the first operation. The first set of events may be a collection of events that are unique to the first event cluster 304. For instance, the first event of events may not be part of any other event cluster. Accordingly, the similarity of the incoming events with the first set of events ensures that the first operation is performed in the computing environment 200.

The comparison of the incoming pattern of events with a subset of the first event pattern ensures earlier detection that the incoming event pattern corresponds to the first operation, compared to detection based on comparison with the entire first event pattern. For instance, the system 100 does not have to wait for the entire first event cluster 304 to be received for performing the comparison and the detection.

If the incoming pattern of events is same as the subset of the first event pattern, the system 100 may determine that the events in the incoming pattern of events are arriving due to the performance of the first operation. For instance, the system 100 may determine that the events in the incoming pattern of events are arriving due to the performance of the first operation if the first set of events is received, and the first set of events is received at the first event arrival rate.

Upon detecting that the first set of events is received due to the performance of the first operation, the system 100 may subject each event of the first set of events to the first handling action corresponding to the event. For example, if the first event 302-3 is part of the first set of events, the system 100 may subject the first event 302-3 to the first handling action determined for the first event 302-3. Similarly, the system 100 may perform the first handling action for each event of the first event cluster 304 as the event arrives. In some cases, not all events of the first event cluster 304 may be received due to the performance of the first operation. This may be because of suppression of some of the preceding events. For instance, if the first event 302-3 is suppressed, a first action triggered by the first event 302-3 is not performed. Therefore, an event corresponding to the first action may not be received. Since the first event cluster 304 was received when no event was suppressed, the first event cluster 304 includes the event corresponding to the first action. Even if all events of the first event cluster 304 are not received due to the performance of the first operation, the system 100 may perform the first handling action for events that are received. The system 100 may start performing the first handling action for events from a time at which events started arriving due to performance of the first operation. For instance, if the first event 302-3 if the earliest event received due to performance of the first operation, the system 100 may start performing the first handling action from a point of time the first event 302-3 arrived. From that point of time, the system 100 may perform the first handling action until the expiry of the time duration 412. As will be understood, the first handling action performed for an event is the first handling action corresponding to that event. Accordingly, the present subject matter ensures that all events arriving due to performance of the first operation are subjected to their corresponding first handling actions.

Once the time duration 412 is expired, if an event that is part of the first event cluster 304, such as the first event 302-3, is received, the system 100 may perform the second handling action corresponding to the event. This is because it is likely that the event is received not due to the performance of the first operation. Therefore, the present subject matter ensures that the first handling action is performed for the events if they are received due to the performance of the first operation, and not otherwise. Thus, unwarranted suppression of the events may be prevented.

In an example, the first handling action for each event of the first event cluster 304 may be consolidated in the form of a suppression rule. Such a suppression rule corresponds to the first operation, as the first event cluster 304 corresponds to the first operation, and may be referred to as the first suppression rule 218. The first suppression rule 218 may include a first list of all the events that are to be suppressed and a second list of all the events that are to be allowed for processing. In another example, the first suppression rule 218 may not specify first handling action for each event of the first event cluster 304, but may specify the events of the first event cluster 304 that are to be suppressed. In both the above examples, once the system 100 detects that events are arriving due to the performance of the first operation, the system 100 may refer to the first suppression rule 218 to determine which events of the first event cluster 304 received during the time duration 412 are to be suppressed and which events are to be allowed, and accordingly handle the events. The first suppression rule 218 may also include the time duration 412. The first suppression rule 218 may be generated after determination of the first handling action and before comparison of event patterns commence. Accordingly, subsequent to defining the first suppression rule 218, in response to detection that the first operation is performed, for each event of the first events 304 received in the time duration, the first handling action corresponding to the event may be performed by referring to the first suppression rule 218.

In an example, upon generation, the first suppression rule 218 may be displayed to a user of the management station for approval. The user may edit the first suppression rule 218 by, for example, altering the first handling action for an event, adjusting the time duration 412, and the like.

In addition to the first operation, several other operations may be performed in the computing environment 200. For instance, the second operation may be performed. Accordingly, the system 100 may include suppression rules corresponding to each operation performed in the computing environment. For example, as mentioned earlier, the system 100 may include the second suppression rule 220. The second suppression rule 220 may be generated in a manner similar to that of the first suppression rule 218. For instance, the system 100 may detect arrival of a second plurality of events at the first event arrival rate. The incoming pattern of the second plurality of events may not be same as the first event pattern. For instance, the second plurality of events may be different from the first event cluster 304, say, by one or more events. Accordingly, the system 100 may determine that the second plurality of events are arriving due to performance of a second operation in the computing environment 200. The system 100 may designate the second plurality of events as being part of a second event cluster. The system 100 may also store the characteristics of the second event cluster and a second event pattern corresponding to the second operation in the event pattern repository 230. Further, the system 100 may determine a handling action to be performed for each event of the second event cluster if the event is received due to the performance of the second operation. The determination may be based on one or more of the three factors as explained earlier. The handling action to be performed for an event if the event is received due to performance of the second operation may be referred to as a third handling action. Similarly, the system 100 may determine a fourth handling action for each event of the second event cluster, which is the handling action to be performed if the event is received without performance of the second operation. Subsequent to determination of the third handling action, if an event of the second event cluster is received due to performance of the second operation, the event may be subjected to the third handling action.

In an example, an event can be received both due to the performance of the first operation and due to the performance of the second operation. Accordingly, the event may be part of both the first event cluster 304 and the second event cluster. In such a case, the event may be subjected to the first handling action if it arrives due to the performance of the first operation and may be subjected to the second handling action if it arrives due to the performance of the second operation. For example, the event indicating that a server is powered on may be received both for a powering on operation and for a profile apply operation. The event may be allowed for processing if the event is received for performance of the powering on operation and may be suppressed for the profile apply operation. Thus, an event may be handled differently depending on a context in which the event is received.

Figure 5:
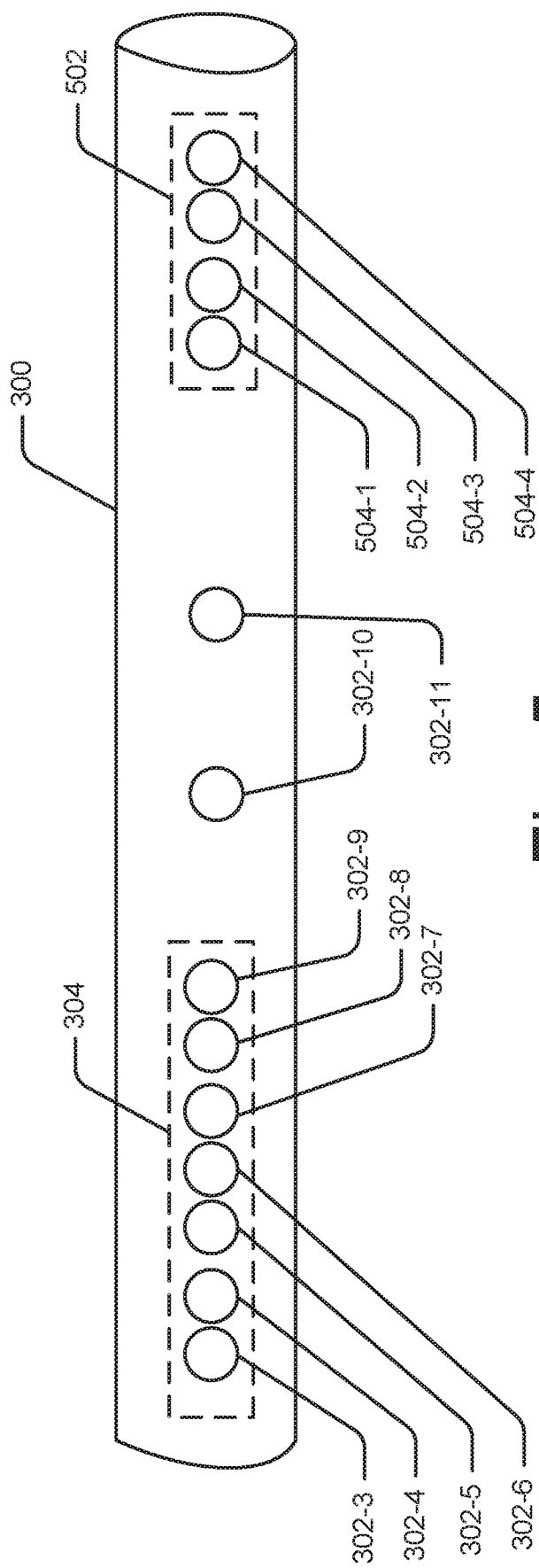
FIG. 5 illustrates an event stream having events received due to performance of a third operation that includes a first operation and a second operation, according to an example implementation of the present subject matter.

In some cases, the first operation and the second operation may be performed together as part of a third operation. For instance, the third operation may be the profile apply operation of the first computing device 202. The profile apply operation may involve powering on of the first computing device 202 followed by updating firmware of a BMC of the first computing device 202. Accordingly, the first operation may be the powering on operation and the second operation may be the firmware update operation. In such cases, the system 100 can handle events between the two operations differently, as will be explained below:

FIG. 5 illustrates the event stream 300 having events received due to performance of a third operation that includes a first operation and a second operation, according to an example implementation of the present subject matter. The event stream 300 may receive the events as shown in FIG. 3 when the system 100 learns various event patterns, where the system 100 does not suppress arriving events. Here, the first event cluster 304 may be received due to performance of the first operation. Further, a second event cluster 502 may be received due to performance of the second operation.

When the system 100 is learning the various event patterns, if the system 100 detects that the first event cluster 304 is followed by the second event cluster 502 in a predetermined period of time, the system 100 may designate the first event cluster 304 and the second event cluster 502 as part of a third event cluster. Further, the system 100 may deduce that the third event cluster corresponds to a third operation that includes the first operation and the second operation. In an example, the system 100 may map the third event cluster to the third operation if the third event cluster repeats for a plurality of times, to ensure that the first event cluster 304 succeeding the second event cluster 502 was not an inadvertent or coincidental succession.

Between the first event cluster 304 and the second event cluster 502, one or more events may be received, such as the event 302-10 and 302-11. Such events may be referred to as intermediate events. In some cases, the system 100 may determine handling actions for the intermediate events. For instance, the system 100 may determine that the intermediate events between the events due to the first operation and events due to the second operation are to be suppressed. The intermediate events may have to be suppressed, as a large number of events due to the first operation are quickly succeeded by a large number of events due to the second operation.

After learning the third event cluster, if the system 100 detects the arrival of the first set of events, indicating performance of the first operation, and detects arrival of a second set of events (which is a subset of the second event cluster 502) within the predetermined period of time, the system 100 may deduce that the third operation is performed. Accordingly, the system 100 may perform a fifth handling action determined for the intermediate events. It is to be noted that the fifth handling action is performed for the intermediate events if they are detected as arriving due to performance of the third operation.

Figure 6:
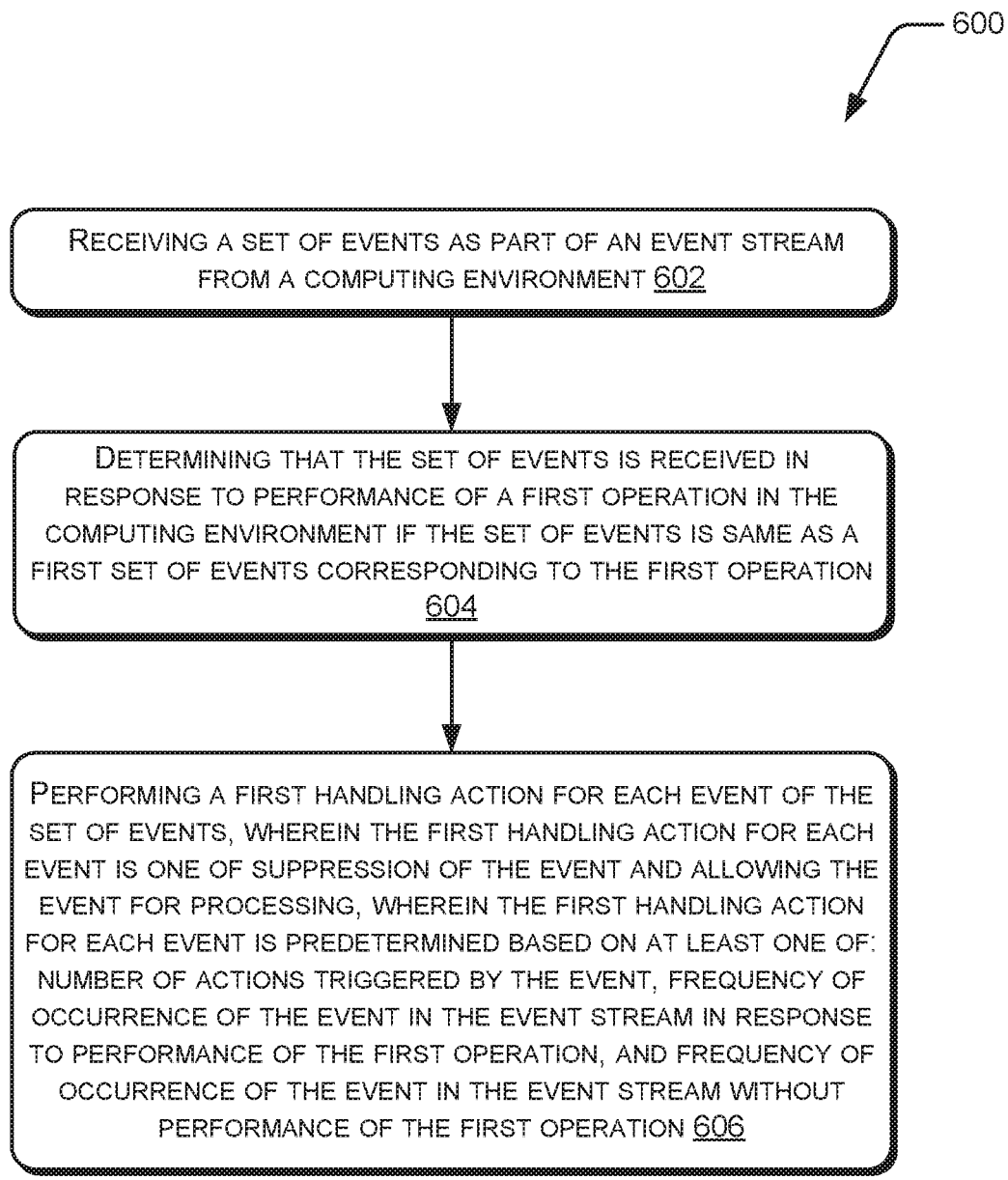
FIG. 6 illustrates a method for operation-based event suppression, according to an example implementation of the present subject matter.
Figure 7:
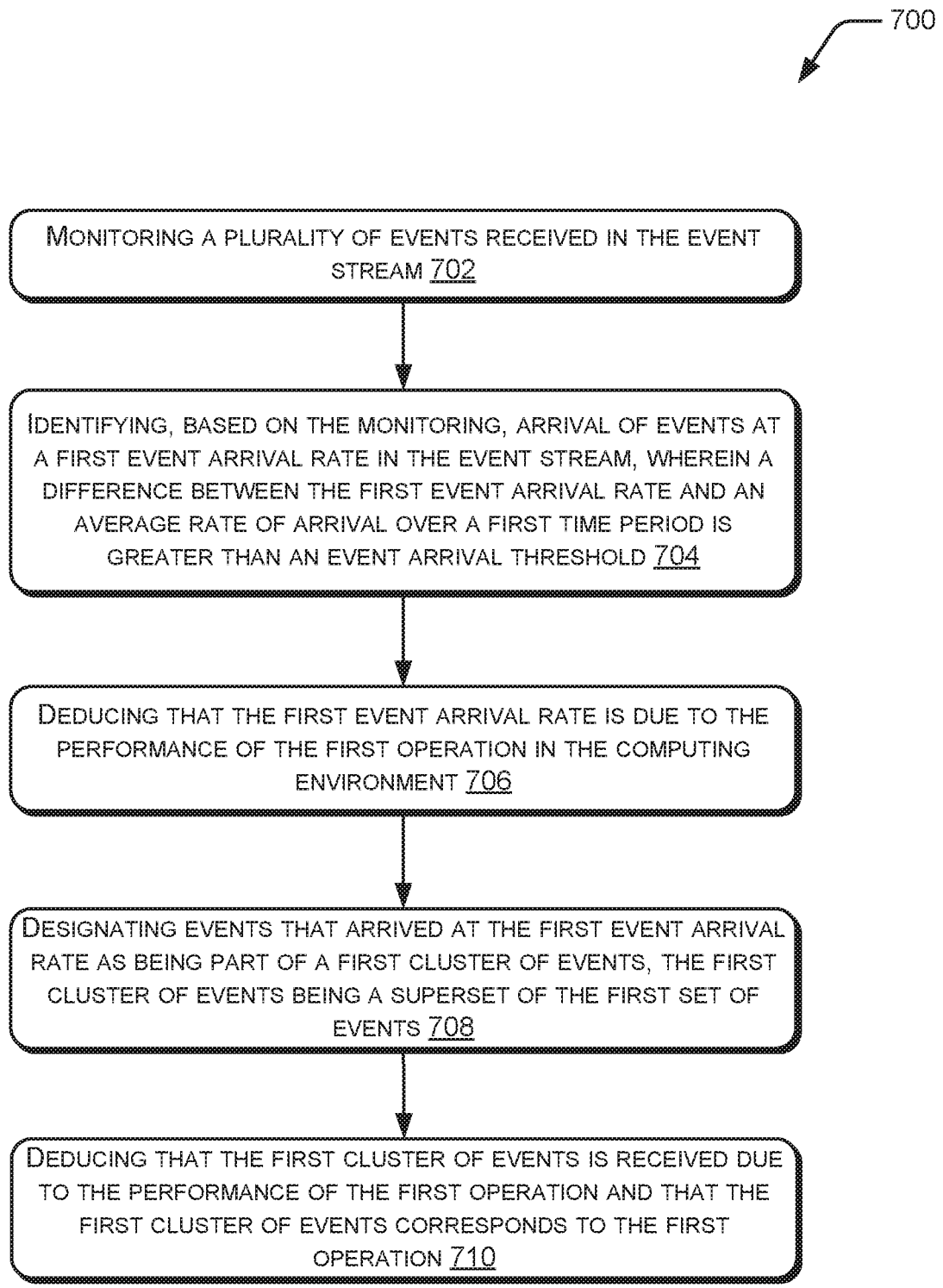
FIG. 7 illustrates a method for determining an event cluster corresponding to an operation, according to an example implementation of the present subject matter.

FIGS. 6 and 7 illustrate methods 600 and 700 respectively for operation-based event suppression, according to example implementations of the present subject matter.

The order in which the methods 600 and 700 are described is not intended to be construed as a limitation, and any number of the described method blocks may be combined in any order to implement the methods 600 and 700, or an alternative method. Furthermore, the methods 600 and 700 may be implemented by processing resource(s) or computing device(s) through any suitable hardware, non-transitory machine-readable instructions, or a combination thereof.

It may be understood that steps of the methods 600 and 700 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 600 and 700 may be implemented in a variety of systems, the methods 600 and 700 are described in relation to the aforementioned system 100, for ease of explanation. In an example, the methods 600 and 700 may be performed by a processing resource, such as the processor 102.

Referring to method 600, at block 602, a set of events is received as part of an event stream from a computing environment. The event stream may be, for example, the event stream 300 and the computing environment may be, for example, the computing environment 200.

At block 604, it may be determined that the set of events is received in response to performance of a first operation in the computing environment if the set of events is same as a first set of events corresponding to the first operation. The first set of events may be, for example, the first set of events explained with reference to FIG. 4. Further, as explained with reference to FIG. 4, the set of events may be events in an incoming event pattern that is compared with the first set of events. In an example, the set of events may be determined to be received in response to performance of the first operation if the set of events is received at the first event arrival rate, as explained earlier.

At block 606, a first handling action is performed for each event of the set of events. The first handling action for each event is one of suppression of the event and allowing the event for processing. The first handling action for each event is predetermined based on at least one of: number of actions triggered by the event, frequency of occurrence of the event in the event stream in response to performance of the first operation, and frequency of occurrence of the event in the event stream without performance of the first operation. The predetermination of the first handling action may be performed before the set of events is received. The first handling action is to be performed for an event of the set of events if the event is received in response to performance of the first operation, as explained earlier.

FIG. 7 illustrates a method 700 for determining an event cluster corresponding to an operation, according to an example implementation of the present subject matter. The method 700 may be performed before the method 600, i.e., prior to receiving the set of events.

At block 702, a plurality of events received in the event stream is monitored.

At block 704, based on the monitoring, an arrival of events at a first event arrival rate in the event stream is identified. A difference between the first event arrival rate and an average rate of arrival over a first time period is greater than an event arrival threshold, as explained with reference to FIG. 3. At block 706, a deduction is performed that the first event arrival rate is due to the performance of the first operation in the computing environment.

At block 708, events that arrived at the first event arrival rate may be designated as being part of a first cluster of events, also referred to as a first event cluster, such as the first event cluster 304. The first event cluster may be a superset of the first set of events, as explained with reference to FIG. 4.

At block 710, a deduction is performed that the first cluster of events is received due to the performance of the first operation. Accordingly, it is deduced that the first cluster of events and the first set of events correspond to the first operation.

In an example, the method 700 may include determining, from among the cluster of events, suppression-suitable events. The suppression-suitable events may be determined based on at least one of: actions triggered by each event, frequency of occurrence of each event due to performance of the first operation, and frequency of occurrence of each event without performance of the first operation. The suppression-suitable events may be specified in a suppression rule corresponding to the first operation, such as the first suppression rule 218. The suppression rule may also specify a time duration, such as the time duration, for which the first event cluster was received.

Accordingly, in the method 600, the first handling action for each event of the set of events may be determined based on the suppression rule. Further, in response to receiving the set of events, each suppression-suitable event received in the time duration may be suppressed. For instance, from a first point of time at which the events started arriving at the first event arrival rate, the suppression-suitable events may be suppressed until expiry of the time duration.

Figure 8:
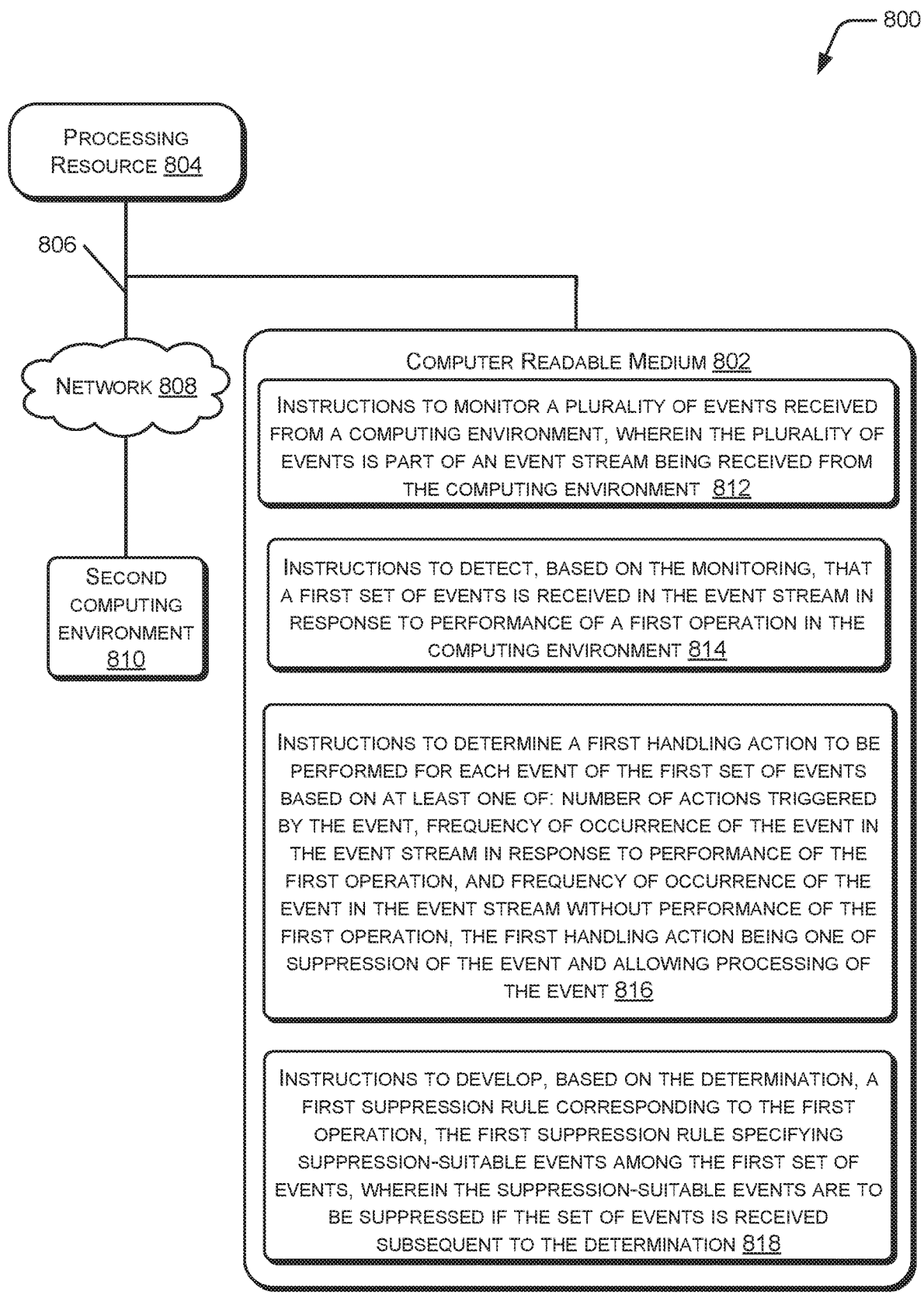
FIG. 8 illustrates a computing environment, implementing a non-transitory computer-readable medium for operation-based event suppression, according to an example implementation of the present subject matter.

FIG. 8 illustrates a first computing environment 800, implementing a non-transitory computer-readable medium 802 for operation-based event suppression, according to an example implementation of the present subject matter.

In an example, the non-transitory computer-readable medium 802 may be utilized by a system, such as the system 100. The system 100 may be implemented in a public networking environment or a private networking environment. In an example, the first computing environment 800 may include a processing resource 804 communicatively coupled to the non-transitory computer-readable medium 802 through a communication link 806.

In an example, the processing resource 804 may be implemented in a system, such as the system 100. The processing resource 804 may be the processor 102. The non-transitory computer-readable medium 802 may be, for example, an internal memory device or an external memory device. In one implementation, the communication link 806 may be a direct communication link, such as any memory read/write interface. In another implementation, the communication link 806 may be an indirect communication link, such as a network interface. In such a case, the processing resource 804 may access the non-transitory computer-readable medium 802 through a network 808. The network 808 may be a single network or a combination of multiple networks and may use a variety of different communication protocols.

The processing resource 804 and the non-transitory computer-readable medium 802 may also be communicatively coupled to a second computing environment 810 over the network 808. The second computing environment 810 may be, for example, the computing environment 200, and will be hereinafter referred to as the computing environment 810.

In an example implementation, the non-transitory computer-readable medium 802 includes a set of computer-readable instructions to perform operation-based event suppression. The set of computer-readable instructions can be accessed by the processing resource 804 through the communication link 806 and subsequently executed to perform operation-based event suppression.

Referring to FIG. 8, in an example, the non-transitory computer-readable medium 802 includes instructions 812 that cause the processing resource 804 to monitor a plurality of events received from the computing environment 810. The plurality of events is part of an event stream, such as the event stream 300, being received from the computing environment 810.

The non-transitory computer-readable medium 802 includes instructions 814 that cause the processing resource 804 to detect, based on the monitoring, that a first set of events is received in the event stream in response to performance of a first operation in the computing environment.

To detect that the first set of events is received in the event stream in response to performance of the first operation, the instructions 814 are executable by the processing resource to identify, based on monitoring of the plurality of events, arrival of events at a first event arrival rate in the event stream. A difference between the first event arrival rate and an average rate of arrival over a first time period is greater than an event arrival threshold. The instructions 814 cause deduction that the first event arrival rate is due to the performance of the first operation in the computing environment. The instructions 814 also cause designation of events that arrived at the first event arrival rate as being part of a first cluster of events, such as the first event cluster 304. The instructions 814 further cause deduction that the first cluster of events is received due to the performance of the first operation.

The non-transitory computer-readable medium 802 includes instructions 816 that cause the processing resource 804 to determine a first handling action to be performed for each event of the first set of events. The first handling action is one of suppression of the event and allowing processing of the event. The determination of the first handling action is performed based on at least one of: number of actions triggered by the event, frequency of occurrence of the event in the event stream in response to performance of the first operation, and frequency of occurrence of the event in the event stream without performance of the first operation.

In an example, the first handling action for an event is determined to be suppression of the event in response to at least one of the number of actions triggered by the event being greater than a first action threshold, the number of actions triggered by the event being lesser than a second action threshold, a frequency of occurrence of the event in the event stream in response to performance of the operation being greater than a first frequency threshold, and a frequency of occurrence of the event in the event stream without performance of the operation being greater than a second frequency threshold. The second action threshold is lesser than the first action threshold.

The non-transitory computer-readable medium 802 may include instructions 818 that cause the processing resource 804 to develop, based on the determination, a first suppression rule corresponding to the first operation. The first suppression rule may specify suppression-suitable events among the first set of events. The suppression-suitable events are to be suppressed if the set of events is received subsequent to the determination. The suppression rule may be, for example, the first suppression rule 218.

Subsequent to the development of the first suppression rule, the first set of events may be received. This indicates that the first operation is performed in the computing environment 810. The non-transitory computer-readable medium 802 may include instructions to suppress each suppression-suitable event specified in the first suppression rule. For instance, if the suppression-suitable events include a first event, such as the first event 302-3, and the first set of events is received, the first event may be suppressed.

In an example, the non-transitory computer-readable medium 802 may include instructions to determine a second handling action to be performed for a first event of the first set of events if the first event is received without performance of the first operation. The second handling action may be determined based on the frequency of occurrence of the first event in the event stream without the first operation. The second handling action is one of suppression of the first event and allowing processing of the first event.

Subsequent to determination of the second handling action, if the first event is received outside of the first set of events, indicating that the first event is received without performance of the first operation, the second handling action may be performed for the first event.

The present subject matter determines a handling action for an event based on a context the event is received in. For instance, the present subject matter determines whether an event is to be suppressed if the event is received due to performance of an operation. Therefore, the present subject matter can be utilized for reducing the number of events to be processed, i.e., acted upon, when the operation is performed. The determination of the handling action based on various factors ensures that a well-informed decision can be taken regarding the events to be suppressed when an operation is performed. Further, it can also be ensured that events that are to be processed continue to be processed even during performance of the operation.

The present subject matter also provides an automated and a dynamic manner of learning event patterns corresponding to operations. Therefore, several operations can be detected as and when they are performed in the computing environment, and the handling actions can be accordingly performed.

Although implementations of operation-based event suppression have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor and storing instructions executable by the processor to:
monitor a plurality of events received from a computing environment, wherein the plurality of events is part of an event stream being received from the computing environment;
detect, based on the monitoring, that a first event is received in the event stream at least in response to performance of a first operation in the computing environment, wherein instructions are executed by the processor to:
identify, based on the monitoring, arrival of events at a first event arrival rate in the event stream, wherein a difference between the first event arrival rate and an average rate of arrival over a first time period is greater than an event arrival threshold;
deduce that the first event arrival rate is due to the performance of the first operation in the computing environment;
designate events that arrived at the first event arrival rate as being part of a first cluster of events; and
deduce that the first cluster of events is received due to the performance of the first operation;
determine a first handling action to be performed for the first event based on frequency of occurrence of the first event in the event stream without performance of the first operation and at least one of: a number of actions triggered by the first event, or frequency of occurrence of the first event in the event stream in response to performance of the first operation, the first handling action being one of suppression of the first event or allowing processing of the first event;
perform the first handling action for the first event received subsequent to the determination and in response to performance of the first operation;
receive a second plurality of events at the first event arrival rate, the second plurality of events being different from the first cluster of events;
deduce that the first event arrival rate is due to performance of a second operation in the computing environment;
designate the second plurality of events as being part of a second cluster of events: and
deduce that the second cluster of events is received in response to performance of the second operation.

2. The system of claim 1, wherein, subsequent to determination of the first handling action, the instructions are executable by the processor to:
receive the first event; and
perform the first handling action for the first event if the first event is detected to be received in response to performance of the first operation.

3. The system of claim 2, wherein
the first cluster of events is a superset of a first set of events,
the first set of events comprises the first event, and
in response to receiving the first event, the instructions are executable by the processor to:
detect that the first event is received due to the performance of the first operation if the first set of events is received at the first event arrival rate.

4. The system of claim 1, wherein the instructions are executable by the processor to:
determine the first handling action corresponding to each event of the first cluster of events:
determine a time duration for which the first cluster of events is received;
define a first Suppression rule corresponding to the first operation, the first suppression rule specifying the first handling action corresponding to each event of the first cluster of events and the time duration for which the first cluster of events is received,
wherein, subsequent to defining the first suppression rule, in response to detection that the first operation is performed, for each event of the first cluster of events received in the time duration, the first handling action corresponding to the event is to be performed by referring to the first suppression rule.

5. The system of claim 4, wherein the instructions are executable to determine the time duration for which the first cluster of events received based on at least one of:
a time until which the events are received at the first event arrival rate; and
comparison of a plurality of versions of the first cluster of events.

6. The system of claim 1, wherein the instructions are executable by the processor to:
determine a second handling action to be performed for the first event if the first event is received without performance of the first operation based on the frequency of occurrence of the first event in the event stream without the first operation, wherein the second handling action is one of suppression of the first event or allowing processing of the first event,
wherein, the second handling action is to be performed for the first event that is received subsequent to the determination of the second handling action and without performance of the first operation.

7. The system of claim 1, wherein the instructions are executable to determine the first handling action to be suppression of the first event in response to at least one of:
the number of actions triggered by the first event being greater than a first action threshold,
the number of actions triggered by the first event being lesser than a second action threshold, the second action threshold being lesser than the first action threshold,
the frequency of occurrence of the first event in the event stream in response to performance of the first operation being greater than a first frequency threshold, and
the frequency of occurrence of the first event in the event stream without performance of the first operation being greater than a second frequency threshold.

8. The system of claim 7, wherein the instructions are executable by the processor to detect that a first cluster of events is received due to the performance of the first operation and wherein the first cluster of events comprises a plurality of first events, and if the frequency of occurrence of the first event in response to performance of the first operation is greater than a first frequency threshold, the instructions are executable by the processor to:
determine the first handling action for a first subset of the plurality of first events to be suppression; and
determine the first handling action for a second subset of the plurality of first events to be allowing of the first event.

9. The system of claim 1, wherein the instructions are executable to:
receive the first cluster of events followed by the second cluster of events in a predetermined period of time;
designate the first cluster of events and the second cluster of events as part of a third cluster of events;

deduce that the third cluster of events corresponds to a third operation that comprises the first operation and the second operation; and determine a fifth handling action to be performed for an intermediate event between the first cluster of events and the second cluster of events, wherein subsequent to determination of the fifth handling action, in response to detection of performance of the third operation, the fifth handling action is to be performed for the intermediate event.

10. A method comprising:

receiving, by a processing resource, a set of events as part of an event stream from a computing environment;

detecting, based on the received set of events, that a first event is received in the event stream at least in response to performance of a first operation in the computing environment, wherein detecting that the first event is received in the event stream comprises:

identifying, based on the received set of events, arrival of events at a first event arrival rate in the event stream, wherein a difference between the first event arrival rate and an average rate of arrival over a first time period is greater than an event arrival threshold;

deducing that the first event arrival rate is due to the performance of the first operation in the computing environment;

designating events that arrived at the first event arrival rate as being part of a first cluster of events; and deducing that the first cluster of events is received due to the performance of the first operation;

determining, by the processing resource, that the set of events is received in response to performance of a first operation in the computing environment if the set of events is same as a first set of events corresponding to the first operation;

performing, by the processing resource, a first handling action for each event of the set of events, wherein the first handling action for each event is one of suppression of the event or allowing the event for processing, wherein the first handling action for each event is predetermined based on frequency of occurrence of the event in the event stream without performance of the first operation and at least one of: a number of actions triggered by the event, or frequency of occurrence of the event in the event stream in response to performance of the first operation;

receiving a second plurality of events at the first event arrival rate, the second plurality of events being different from the first cluster of events;

deducing that the first event arrival rate is due to performance of a second operation in the computing environment;

designating the second plurality of events as being part of a second cluster of events; and deducing that the second cluster of events is received in response to performance of the second operation.

11. The method of claim 10, comprising:

determining the first handling action for each event of the set of events based on a first suppression rule corresponding to the first operation, the first suppression rule specifying suppression-suitable events among the first cluster of events and a time duration for which the first cluster of events was received.

12. The method of claim 11, comprising:

in response to receiving the set of events, suppressing each suppression- suitable event received in the time duration.

13. A non-transitory computer-readable medium comprising instructions for performing operation-based event suppression, the instructions being executable by a processing resource to:

monitor a plurality of events received from a computing environment, wherein the plurality of events is part of an event stream being received from the computing environment;

detect, based on the monitoring, that a first set of events is received in the event stream in response to performance of a first operation in the computing environment, wherein detecting that the first set of events is received in the event stream comprises:

identifying, based on the monitoring, arrival of events at a first event arrival rate in the event stream, wherein a difference between the first event arrival rate and an average rate of arrival over a first time period is greater than an event arrival threshold;

deducing that the first event arrival rate is due to the performance of the first operation in the computing environment;

designating events that arrived at the first event arrival rate as being part of a first cluster of events; and deducing that the first cluster of events is received due to the performance of the first operation;

determine a first handling action to be performed for each event of the first set of events based on frequency of occurrence of the event in the event stream without performance of the first operation and at least one of: a number of actions triggered by the event, or frequency of occurrence of the event in the event stream in response to performance of the first operation, the first handling action being one of suppression of the event or allowing processing of the event; and develop, based on the determination, a first suppression rule corresponding to the first operation, the first suppression rule specifying suppression-suitable events among the first set of events; and suppress the suppression-suitable events if the set of events is received subsequent to the determination;

receive a second plurality of events at the first event arrival rate, the second plurality of events being different from the first cluster of events;

deduce that the first event arrival rate is due to performance of a second operation in the computing environment;

designate the second plurality of events as being part of a second cluster of events; and deduce that the second cluster of events is received in response to performance of the second operation.

14. The non-transitory computer-readable medium of claim 13, wherein, subsequent to the development of the first suppression rule, the instructions are executable by the processing resource to:

receive the first set of events; and suppress each suppression-suitable event specified in the first suppression rule.

15. The non-transitory computer-readable medium of claim 13, wherein the instructions are executable by the processing resource to:

determine the first handling action to be suppression of the event in response to at least one of:

the number of actions triggered by the event being greater than a first action threshold, the number of actions triggered by the event being lesser than a second action threshold, the second action threshold being lesser than the first action threshold, a frequency of occurrence of the event in the event stream in response to performance of the operation being greater than a first frequency threshold, and a frequency of occurrence of the event in the event stream without performance of the operation being greater than a second frequency threshold.

16. The non-transitory computer-readable medium of claim 13, wherein the instructions are executable by the processing resource to:

determine a second handling action to be performed for a first event of the first set of events if the first event is received without performance of the first operation, wherein the second handling action is determined based on the frequency of occurrence of the first event in the event stream without the first operation, wherein the second handling action is one of suppression of the first event or allowing processing of the first event, wherein subsequent to determination of the second handling action, the second handling action is to be performed for the first event if the first event is received outside of the first set of events.

\* \* \* \* \*